(12) United States Patent
Kaneuchi et al.

(10) Patent No.: US 11,198,277 B2
(45) Date of Patent: Dec. 14, 2021

(54) WOODEN DECORATIVE BOARD, METHOD FOR MANUFACTURING THE SAME, AND MOLDED ARTICLE WITH WOODEN DECORATIVE BOARD

(71) Applicant: Panasonic Intellectual Property Management Co., Ltd., Osaka (JP)

(72) Inventors: Kazuhiko Kaneuchi, Osaka (JP); Tomonori Sugiyama, Osaka (JP); Hideaki Nakagawa, Osaka (JP); Takeshi Kiritoshi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/695,905

(22) Filed: Nov. 26, 2019

(65) Prior Publication Data

US 2020/0171801 A1  Jun. 4, 2020

(30) Foreign Application Priority Data

Nov. 30, 2018 (JP) .............................. JP2018-225640
Sep. 20, 2019 (JP) .............................. JP2019-171862

(51) Int. Cl.
*B32B 21/08* (2006.01)
*B29C 45/14* (2006.01)
(Continued)

(52) U.S. Cl.
CPC .............. *B32B 21/08* (2013.01); *B27M 1/02* (2013.01); *B29C 45/14336* (2013.01);
(Continued)

(58) Field of Classification Search
CPC ..... B32B 21/08; B32B 3/263; B32B 3/37025; B29C 45/14336; B27M 1/02; B29K 2711/14
(Continued)

(56) References Cited

U.S. PATENT DOCUMENTS

| 6,025,064 A | * | 2/2000 | Kawata | ............. B29C 45/14811 |
| | | | | 428/304.4 |
| 2004/0209032 A1 | * | 10/2004 | Wani | ................... B29C 45/1671 |
| | | | | 428/57 |
| 2006/0029825 A1 | * | 2/2006 | Chen | ...................... B05D 7/57 |
| | | | | 428/537.1 |

FOREIGN PATENT DOCUMENTS

| JP | 61116530 A | * | 6/1986 | ............... B44C 5/06 |
| JP | 11-983 | | 1/1999 | |

(Continued)

OTHER PUBLICATIONS

Machine_English_translation_JP_2010046866_A; Wood Decorative Plate and Its Manufacturing Method; Mar. 4, 2010; EPO; whole document (Year: 2010).*

(Continued)

*Primary Examiner* — Tahseen Khan
(74) *Attorney, Agent, or Firm* — Wenderoth, Lind & Ponack, L.L.P.

(57) ABSTRACT

A wooden decorative board includes: an uneven board made of natural wood and including a plurality of uneven portions provided on a surface due to xylem vessels; and a hard coat layer or a protective layer having uneven portions different in size provided on a surface of the uneven board, wherein concave portions and a plurality of concave portions smaller than the concave portions are provided on a surface of the hard coat layer or the protective layer.

7 Claims, 10 Drawing Sheets

(51) Int. Cl.
| | |
|---|---|
| *B32B 37/00* | (2006.01) |
| *B32B 3/26* | (2006.01) |
| *B27M 1/02* | (2006.01) |
| *B29L 7/00* | (2006.01) |
| *B29K 711/14* | (2006.01) |

(52) U.S. Cl.
CPC ............ *B32B 3/263* (2013.01); *B32B 37/025* (2013.01); *B29K 2711/14* (2013.01); *B29L 2007/002* (2013.01)

(58) Field of Classification Search
USPC .......................................................... 428/172
See application file for complete search history.

(56) References Cited

FOREIGN PATENT DOCUMENTS

| | | | | |
|---|---|---|---|---|
| JP | 2010046866 | A | * | 3/2010 |
| JP | 2018094791 | A | * | 6/2018 |

OTHER PUBLICATIONS

Machine_English_translation_JP_61116530_A; Formation of Wood Like Decorative Film; Jun. 4, 1986; EPO; whole document (Year: 1986).*
Machine_english_translation_JP_2018094791_A; Ota, Arata; Decorative Sheet and Decorative Plate; Jun. 21, 2018; whole document (Year: 2018).*

* cited by examiner

PARTIALLY ENLARGED VIEW 1-1

PARTIALLY ENLARGED VIEW 1-2

PARTIALLY ENLARGED VIEW 1-3

PARTIALLY ENLARGED VIEW 1-4

PARTIALLY ENLARGED VIEW 4-1

WOODEN DECORATIVE BOARD, METHOD FOR MANUFACTURING THE SAME, AND MOLDED ARTICLE WITH WOODEN DECORATIVE BOARD

CROSS-REFERENCE TO RELATED APPLICATIONS

This application claims priorities of Japanese Patent Application No. 2018-225640 filed on Nov. 30, 2018 and Japanese Patent Application No. 2019-171862 filed on Sep. 20, 2019, the contents of which is incorporated herein by reference.

BACKGROUND

1. Technical Field

The present disclosure relates to a wooden decorative board, a method for manufacturing the same, and a molded article using the same. Particularly, the present disclosure relates to a wooden decorative board having an appearance of a uneven board that is thinly sliced natural wood and an uneven structure on a surface of a hard coat layer or a protective layer formed on a uneven board surface. The present disclosure relates to a wooden decorative board for decorative parts maintaining a matte surface and a tactile sensation obtained from unevenness unique to real wood and satisfying the durability required for industrial products, a method for manufacturing the same, and a molded article using the same.

2. Description of the Related Art

Regarding the needs for decoration in the fields of home appliances and in-vehicle interiors, a wide variety of design expressions is recently demanded due to diversification of customer preferences, and highly elaborate design is demanded mainly for high-grade products using natural uneven board in some cases.

Decorative techniques using a uneven board include a technique in which the uneven board itself is affixed to a housing surface of a molded part etc. to express an appearance with a wooden decorative board, and a technique in which an adhesive layer adhering to an injection molding resin or a functional layer having a function equivalent thereto is arranged on a back surface of the uneven board in advance before integrating the wooden decorative board and the molding resin by injection molding or vacuum molding.

A layer structure of a molded article using a conventional wooden decorative board will be described with reference to FIG. 5. FIG. 5 is a cross-sectional view showing a layer structure of an insert-molded article 9 using a conventional wooden decorative board 8. The conventional wooden decorative board 8 has a multilayer structure. The board includes a first adhesive layer 2 for bonding to an injection molding resin as well as a uneven board 4 manufactured by slicing natural wood and a support 3 for affixing the uneven board 4 to form a sheet. On a surface of the uneven board 4 opposite to the support 3, the board includes a transparent film 6 for protecting the surface of the uneven board 4 and a second adhesive layer 5 for bonding the transparent film 6 and the uneven board 4, and a hard coat layer 7 is formed for increasing the hardness of the surface of the transparent film 6. A decoration method uses a wooden decorative board provided with an injection molding resin layer integrated by a general insert molding method with this wooden decorative board 8 arranged with the first adhesive layer 2 of the wooden decorative board 8 facing toward the injection molding resin (see, e.g., Japanese Laid-Open Patent Publication No. 11-983).

A layer structure of a molded article of a conventional open-pore type wooden decorative board will be described with FIG. 6. The "open pore" in this case refers to a wooden decorative board having a design surface in which xylem vessels on a uneven board surface are opened. The same constituent elements as FIG. 5 will be denoted by the same reference numerals. FIG. 6 is a cross-sectional view of a layer structure of a molded article of an open-pore type wooden decorative board. Reference numeral 11 of FIG. 6 denotes a wooden decorative board having the uneven board 4 without a protective layer on the surface, and the wooden decorative board 11 is integrated with the injection molding resin layer 1 by insert molding into a molded article. Subsequently, to leave unevenness due to the xylem vessels on the surface of the uneven board 4 by coating, a protective layer 10 is formed as thin coating to leave unevenness due to the xylem vessels on the surface of the uneven board 4 so as to obtain a molded part 12 in a decoration method.

However, the molded articles using the conventional wooden decorative boards described with reference to FIGS. 5 and 6 have the following problems. In the decoration method of the molded article 9 using the conventional wooden decorative board of FIG. 5, a thick transparent film of 100 μm or more, for example, is disposed on the surface of the uneven board 4. This enables decoration giving a high class feel to the surface of the uneven board 4 from a glossy feeling and a depth feeling due to the thickness of the transparent film surface; however, the original matte feeling of the surface of the uneven board 4 and the original unevenness of the surface of the uneven board 4 due to the xylem vessels are covered with the transparent film. Therefore, the feeling and unevenness hardly appear on the surface, which makes it difficult to ensure a reliability as an industrial product while maintaining the original texture of wood hardly appearing on the surface. Additionally, if the uneven board 4 is deformed by molding for the purpose of use for an industrial product, the transparent film disposed on the surface of the uneven board 4 may cause a shape deformation. Moreover, as a drawing amount increases, a difference in mechanical properties of expansion/contraction amounts between the uneven board 4 and the transparent film causes problems of breakage and delamination between the uneven board 4 and the transparent film more stretchable than the uneven board 4.

In the case of the molded article of the conventional open-pore wooden decorative board shown in FIG. 6, the uneven tactile sensation from the xylem vessels on the uneven board surface remains on the protective layer 10 having the unevenness due to coating leaving the xylem vessels on the surface of the uneven board 4. However, it is difficult to uniformly coat the surface of the uneven board 4 so as to avoid orange-peel coating defect caused when the protective layer 10 is formed by coating as a non-uniform uneven film, and know-how and skill are required for the manufacturing, which makes it difficult to keep constant quality. Additionally, to eliminate the orange peel, the coated surface may be polished in a subsequent step as needed, which causes a problem of an increase in number of steps.

Other problems include a fundamental problem of coating that a subsequent step is necessary after molding, causing problems of an increase in number of steps, poor coating efficiency of coating material during coating, and a large material loss. Moreover, quality control for beautifully leaving the xylem vessels on the surface of the uneven board 4 is difficult, and the manufacturing cost tends to increase. Since the coating is performed in a subsequent step, although the unevenness due to the xylem vessels on the surface of the uneven board 4 remains, a smooth portion remains on a coated surface, and therefore, the original matte feeling of the surface of the uneven board 4 is hardly maintained so that a glossy feeling appears, resulting in a molded article of a wooden decorative board looking different from the original texture of natural wood.

Therefore, it is difficult to produce a wooden decorative board having durability usable for an industrial product and enabling low-loss manufacturing while maintaining the original matte feeling and tactile sensation of a uneven board that is sliced natural wood.

SUMMARY

One non-limiting and exemplary embodiment provides a wooden decorative board having a reliability applicable to industrial products while maintaining a matte feeling and a tactile sensation of a uneven board surface, a method for manufacturing the same, and a molded article using the same.

In one general aspect, the techniques disclosed here feature: a wooden decorative board includes:

an uneven board made of natural wood and including a plurality of uneven portions provided on a surface due to xylem vessels; and a hard coat layer or a protective layer having uneven portions different in size provided on a surface of the uneven board, wherein concave portions and a plurality of concave portions smaller than the concave portions are provided on a surface of the hard coat layer or the protective layer.

In another general aspect, the techniques disclosed here feature: a method for manufacturing a wooden decorative board, includes:

providing a uneven board made of natural wood having a plurality of uneven portions provided on a surface due to xylem vessels;

providing a transfer film having at least a base film, a release layer, and a hard coat layer or a protective layer, wherein two or more types of fillers different in size are added to the release layer, wherein a plurality of convex shapes different in size formed by the fillers different in size is formed on a surface of the release layer, and wherein on a surface of the hard coat layer or the protective layer provided on the release layer on the upper side, a plurality of concave shapes different in size formed on the release layer is present and is formed in a protruded/recessed state inverted from a surface of the release layer; and using the transfer film to transfer the hard coat layer or the protective layer of the transfer film to a surface of the uneven board.

As described above, the wooden decorative board and the method for manufacturing the same according to the present disclosure enables the fabrication of the molded article maintaining the original matte feeling, tactile sensation due to uneven portions, and apparent texture of the surface of the uneven board, which is difficult to achieve with conventional wooden decorative boards and molded parts decorated by using the boards. Therefore, both the original appearance quality of the uneven board and the durability usable for industrial products can be satisfied. The use of the present disclosure can provide the wooden decorative board having high reliability and original appearance quality of a uneven board at a low cost through stable manufacturing.

Additional benefits and advantages of the disclosed embodiments will be apparent from the specification and figures. The benefits and/or advantages may be individually provided by the various embodiments and features of the specification and drawings disclosure, and need not all be provided in order to obtain one or more of the same.

BRIEF DESCRIPTION OF THE DRAWINGS

The present disclosure will become readily understood from the following description of non-limiting and exemplary embodiments thereof made with reference to the accompanying drawings, in which like parts are designated by like reference numeral and in which:

FIG. 4A-2 is an explanatory diagram of the method for manufacturing an insert-molded article using the wooden decorative board according to the first embodiment;

FIG. 4A-3 is an explanatory diagram of the method for manufacturing an insert-molded article using the wooden decorative board according to the first embodiment;

FIG. 4B-1 is an explanatory diagram of the method for manufacturing an insert-molded article using the wooden decorative board according to the first embodiment;

FIG. 4B-2 is an explanatory diagram of the method for manufacturing an insert-molded article using the wooden decorative board according to the first embodiment;

FIG. 4C-1 is an explanatory diagram of the method for manufacturing an insert-molded article using the wooden decorative board according to the first embodiment;

FIG. 4C-2 is an explanatory diagram of the method for manufacturing an insert-molded article using the wooden decorative board according to the first embodiment;

FIG. 4C-3 is an explanatory diagram of the method for manufacturing an insert-molded article using the wooden decorative board according to the first embodiment;

FIG. 4C-4 is an explanatory diagram of the method for manufacturing an insert-molded article using the wooden decorative board according to the first embodiment;

DETAILED DESCRIPTION

Figure 1A:
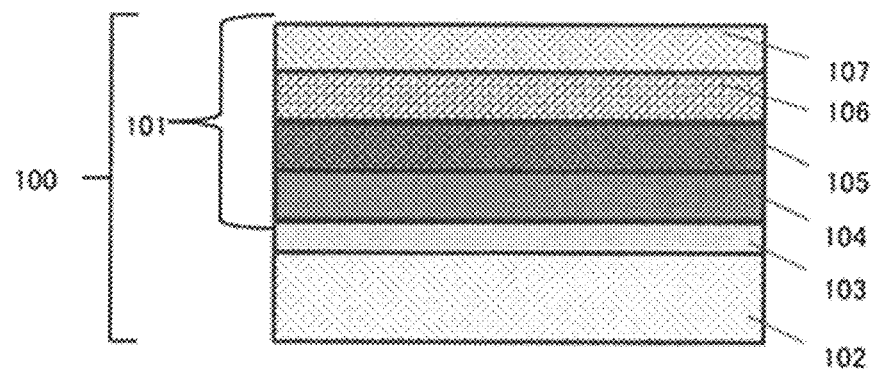
FIG. 1A is a cross-sectional view showing a layer structure of a transfer film according to a first embodiment.

A wooden decorative board according to a first aspect including:

an uneven board made of natural wood and including a plurality of uneven portions provided on a surface due to xylem vessels; and a hard coat layer or a protective layer having uneven portions different in size provided on a surface of the uneven board, wherein concave portions and a plurality of concave portions smaller than the concave portions are provided on a surface of the hard coat layer or the protective layer.

The configuration can provide an uneven tactile sensation and a matte feeling on the uneven board surface by using a transfer film. Additionally, a matt release layer having complex uneven portions different in size smaller than the size of the xylem vessels of the uneven board is formed on a base film used for the transfer film, and a transfer layer for transferring to the surface of the uneven board is formed on the matt release layer as a transfer layer that is a thin film having multiple functions. The transfer layer is made up of multiple layers including the hard coat layer or the protective layer formed on the release layer, and an ultraviolet cut layer (hereinafter referred to as UV cut layer), an anchor layer, and a uneven board adhesive layer for bonding to the uneven board are also formed.

By using the transfer film, the hard coat layer or the protective layer can be formed on the surface of the uneven board along the uneven portions of the xylem vessels on the surface of the uneven board.

In the configuration, particularly when the transfer film is peeled, the film is peeled between the matte release layer on the base film and the hard-coat layer or the protective layer. This maintains the original uneven tactile sensation of the uneven board and the complex large and small concave portions different in size formed on the surface of the hard coat layer or protective layer and enables formation of the wooden decorative board having durability usable for an industrial product while maintaining the original matte texture of the uneven board.

The wooden decorative board according to a second aspect, in the first aspect, regarding a magnitude relationship of height difference or depth of uneven shapes on the surface of the hard coat layer or the protective layer, when a height or depth of the uneven portions having a shape similar to the xylem vessels of the uneven board is called as H1, a height or depth of the concave portions formed on the surface of the hard coat layer or the protective layer is called as H2, and a height or depth of the plurality of concave portions smaller than the concave portions provided on the surface of the hard coat layer or the protective layer is called as H3, wherein a magnitude relationship among the height or depth H1, H2, and H3 satisfies a relational expression of H1>H2>H3.

The wooden decorative board according to a third aspect, in the second aspect, the plurality of concave portions provided on the surface of the hard coat layer or the protective layer on the surface of the wooden decorative board have transferring surface of fillers different in size.

The wooden decorative board according to a fourth aspect, in the third aspect, the height or depth H2 of the concave portions provided on the surface of the hard coat layer or the protective layer is 15 µm or more and 30 µm or less.

The concave portions having the height or depth H2 is formed of a filler having an average particle diameter of 15 µm or more and 30 µm or less. This enables the surface of the hard coat layer 104 to give the uneven tactile sensation.

The wooden decorative board according to a fifth aspect, in the third aspect, the height or depth H3 of the concave portions smaller than the concave portions provided on the surface of the hard coat layer or the protective layer is 0.5 µm or more and 8 µm or less.

The wooden decorative board according to a sixth aspect, in the first aspect, a glossiness of the surface of the hard coat layer or the protective layer on the surface of the wooden decorative board is 10% or less at all angles of 20°, 60°, and 85°.

The wooden decorative board according to a seventh aspect, in the first aspect, the hard coat layer or the protective layer provided on the surface of the wooden decorative board is made of an after-cure type ultraviolet-curing resin or an electron-beam-curing resin.

The wooden decorative board according to an eighth aspect, in the first aspect, a layer configuration of films provided on the surface of the wooden decorative board is made up of a plurality of layers including at least one of an ultraviolet cut layer, an anchor layer, and an adhesive layer in addition to the hard coat layer or the protective layer.

The wooden decorative board according to a ninth aspect, in the first aspect, a total thickness of the films provided on the surface of the wooden decorative board is 4 µm or more and 80 µm or less.

The wooden decorative board according to a tenth aspect, in the first aspect, the uneven board used for the wooden decorative board is impregnated with resin inside the uneven board.

A method for manufacturing a wooden decorative board according to a eleventh aspect, the method including:

providing a uneven board made of natural wood having a plurality of uneven portions provided on a surface due to xylem vessels;

providing a transfer film having at least a base film, a release layer, and a hard coat layer or a protective layer, wherein two or more types of fillers different in size are added to the release layer, wherein a plurality of convex shapes different in size formed by the fillers different in size is formed on a surface of the release layer, and wherein on a surface of the hard coat layer or the protective layer provided on the release layer on the upper side, a plurality of concave shapes different in size formed on the release layer is present and is formed in a protruded/recessed state inverted from a surface of the release layer; and using the transfer film to transfer the hard coat layer or the protective layer of the transfer film to a surface of the uneven board.

The method for manufacturing a wooden decorative board according to a twelfth aspect, in the eleventh aspect, a transfer layer including the hard coat layer or the protective layer is provided on the surface of the uneven board by overlapping the transfer film and the uneven board, and bonding the transfer layer including the hard coat layer or the protective layer to the surface of the uneven board of the transfer film with a method selected from the group consisting of hot pressing, vacuum heat laminating, vacuum forming, pressure forming, and vacuum pressure forming.

With the configuration, the large and small complex concave portions different in size formed randomly (irregularly) via the matt release layer are formed on the surface of the hard coat layer or the protective layer. As a result, external light applied to the surface of the hard coat layer or the protective layer is finely scattered into scattering light by the small concave portions among these concave portions, so that the original matte feeling of the surface of the uneven board is maintained.

According to the configuration, the hard coat layer or the protective layer formed on the surface of the uneven board are not brought into direct contact with a plate for hot pressing during hot pressing and are pressed via the base film of the transfer film, and this hardly crushes the complex concave portions different in height or depth on the surface of the hard coat layer or the protective layer formed via the matt release layer and the uneven tactile sensation due to the original xylem vessels of the surface of the uneven board.

The method for manufacturing a wooden decorative board according to a thirteenth aspect, in the eleventh aspect, further including: changing a surface roughness and a matte feeling of the release layer formed on the side of the transfer film on which the transfer layer including the hard coat layer or the protective layer is formed, such that a surface roughness and a matte feeling of the surface of the hard coat layer or the protective layer transferred to the surface of the uneven board is adjusted, and a method of changing the surface roughness and the matte feeling of the release layer is to add a plurality of fillers different in size to the release layer to adjust the fillers in terms of size and respective addition amounts.

According to the configuration, the matte feeling and the concave portions of the surface of the hard coat layer or the protective layer transferred to the surface of the uneven board can finely be adjusted by changing a combination of sizes and addition amounts of multiple types fillers added to the matt release layer on the transfer film. This enables fine adjustment of the matte feeling and the size of the concave portions of the hard coat layer or the protective layer on the surface in accordance with customer needs while maintaining the original matte feeling and tactile sensation due to the uneven portions of the surface of the uneven board. This enables provision of the wooden decorative board that can finely be customized in accordance with customer needs difficult to satisfy with conventional methods and a molded part using the same.

The method for manufacturing a wooden decorative board according to a fourteenth aspect, in the eleventh aspect, a depth of convex portions of the surface of the release layer formed on the transfer film is smaller than the height difference or depth of the uneven portions due to the xylem vessels on the surface of the uneven board.

A method for manufacturing a molded article according to a fifteenth aspect, the method includes:

preforming the uneven board by hot pressing into a shape close to a final product by using the wooden decorative board manufactured by the method for manufacturing according to the eleventh aspect; and injection molding to an adhesive layer or an adhesive functional surface formed on the surface of the uneven board on the side to which the transfer layer including the hard coat layer or the protective layer is not transferred so as to form a molding resin layer and thereby manufacturing a resin part having a surface provided with the uneven board to which the transfer layer is applied, and the injection molding step is called as insert molding step.

The method for manufacturing a molded article according to a sixteenth aspect, in the fifteenth aspect, at one or both of the preform step and the insert molding step, embossing is formed on a mold surface in contact with the uneven board side on which the transfer layer is formed, and at one or both of the preform step and the insert molding step, the embossing of the mold surface is partially or entirely transferred to the surface of the hard coat layer or the protective layer formed on the surface of the uneven board.

The method for manufacturing a molded article according to a seventeenth aspect, in the fifteenth aspect, the base film of the transfer film is peeled from the surface of the wooden decorative board at a final step after the molded article is completed at the insert molding step.

A molded article according to a eighteenth aspect using the wooden decorative board according to the first aspect, a plurality of uneven shapes different in size is formed on the surface of the hard-coat layer or the protective layer, the uneven shapes include uneven shapes transferred from other than uneven portions due to xylem vessels of the uneven board, and uneven portions having a largest size among the transferred uneven shapes has a convex shape.

A transfer film, a wooden decorative board, a manufacturing method thereof, a molded article using the wooden decorative board, and a manufacturing method thereof according to embodiments will be described with reference to the drawings. In the drawings, substantially the same members are denoted by the same reference numerals.

First Embodiment

<Transfer Film>

Figures 1, 4A:
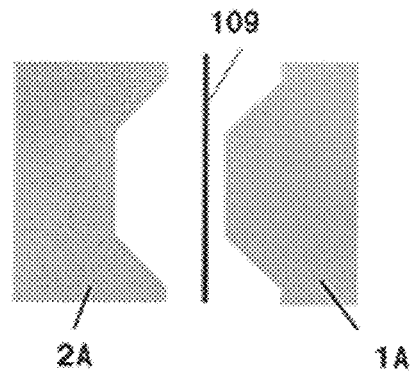
FIG. 4A-1 is an explanatory diagram of a method for manufacturing an insert-molded article using the wooden decorative board according to the first embodiment.
Figure 5:
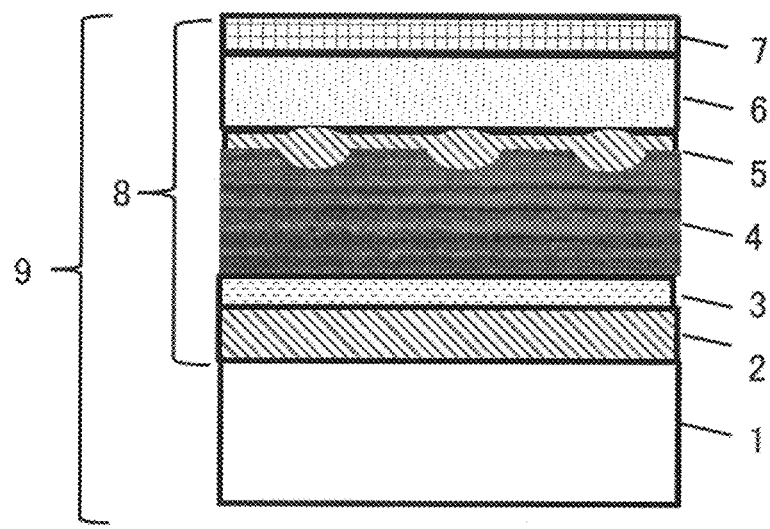
FIG. 5 is a cross-sectional view showing a layer structure of a molded article of a conventional wooden decorative board.
Figure 6:
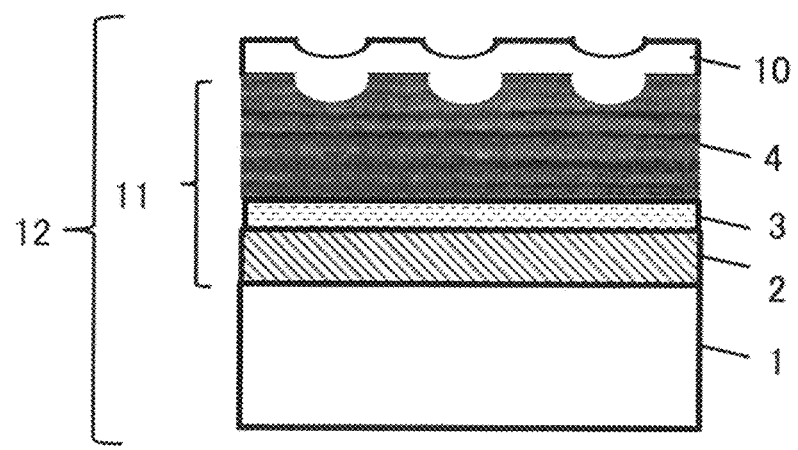
FIG. 6 is a cross-sectional view showing a layer structure of a molded article of a conventional open-pore type wooden decorative board.

FIG. 1A is a cross-sectional view of a layer configuration of a transfer film in a first embodiment. In FIG. 1, the same constituent elements as FIGS. 5 and 6 are denoted by the same reference numerals and will not be described. A transfer film 100 shown in FIG. 1A is used for a wooden decorative board. This transfer film 100 includes a matt release layer 103 having a surface provided with multiple convex portions, the matt release layer being formed on a base film 102. A hard coat layer 104 is formed on the matt release layer 103, and an anchor layer 105, a UV cut layer 106, and a uneven board adhesive layer 107 are formed on the hard coat layer 104. The transfer film 100 is made up of the hard coat layer 104, the anchor layer 105, the UV cut layer 106, and the uneven board adhesive layer 107. Among them, the hard coat layer 104, the anchor layer 105, the UV cut layer 106, and the uneven board adhesive layer 107 are transferred to a uneven board surface and serve as a transfer layer 101. The transfer film 100 may be manufactured by using a continuous roll film or a sheet film and is generally manufactured by using a roll film with high productivity.

Constituent elements constituting this transfer film 100 will hereinafter be described.

<Base Film>

An average thickness of the base film 102 may be within a range of 20 μm to 50 μm in use. To enhance the followability of the transfer film 100 at the time of transfer to a uneven board surface, the average thickness may be 30 μm or more and 50 μm or less. When the transfer film 100 is manufactured, the matt release layer 103, the hard coat layer 104, the anchor layer 105, the UV cut layer 106, and the uneven board adhesive layer 107 are formed on the base film 102. When thermal drying or UV curing is performed in the process of forming each layer, the base film 102 having a thickness less than 20 μm likely to cause wrinkles, tears, and warpage, resulting in poor handling. The base film 102 having a thickness greater than 50 μm likely to deteriorate the followability of the transfer film to a transfer object. When it is desired to hold the base film 102 without being peeled from the transfer object immediately after the transfer film 100 is transferred, a contraction amount of the base film 102 is larger than that of the uneven board 4 when comparing the contraction amount between the uneven board 4 and the base film 102. Therefore, the contraction of the base film 102 pulls the uneven board 4 and increases warpage, reducing the handleability of a wooden decorative board. When the thickness is greater than 50 μm, a roll film of the transfer film 100 having the same number of windings becomes thicker and heavier as compared to when a thin film is used as the base film 102. This deteriorates the handleability when the film is carried around and increases the cost of the base film. The thickness of the base film may appropriately be selected within the range depending on the purpose, and the range may be exceeded as long as the same effect is obtained. A PET or acrylic film is generally used as the base film, and other materials are used without limitations as long as the same effect is obtained.

<Matte Release Layer>

The matt release layer 103 plays a role of releasing from the transfer film 100 and transferring the hard coat layer 104, the anchor layer 105, the UV cut layer 106, and the uneven board adhesive layer 107 to the uneven board. A thermosetting melamine resin, a two-pack curing type urethane resin, a thermosetting silicone resin, etc. are generally used for the matt release layer 103. However, the material is not particularly limited as long as the same releasing effect is obtained. To make a surface of the matt release layer 103 matt and make it easy to feel a tactile sensation when touched by hand, multiple types of fillers different in size may be added together with the resin to form the matt release layer 103.

<Filler>

For the filler, general cross-linked acrylic beads or silica particles of inorganic material are generally used and are advantageous in terms of availability and cost. However, other materials are usable as long as the same effect is obtained. Regarding the shape of the filler, a spherical shape is easily available, and a convex shape can easily be formed; however, the shape may be a shape other than spherical shape such as a scale shape, a hemispherical shape, and an irregular shape and is not particularly limited as long as the same effect is obtained. Additionally, the properties of the filler such as solid, porous, and hollow fillers are not particularly limited as long as the intended effect is obtained.

Three types of the fillers were added to the matt release layer 103 for this description and were spherical cross-linked acrylic beads having an average particle diameter of 20 μm, silica particles having an average particle diameter of 4.5 μm, and spherical silica particles having an average particle diameter of 1.5 μm, for example. These three types of fillers were added to form multiple random convex portions on the surface of the matt release layer 103.

Figure 1B:
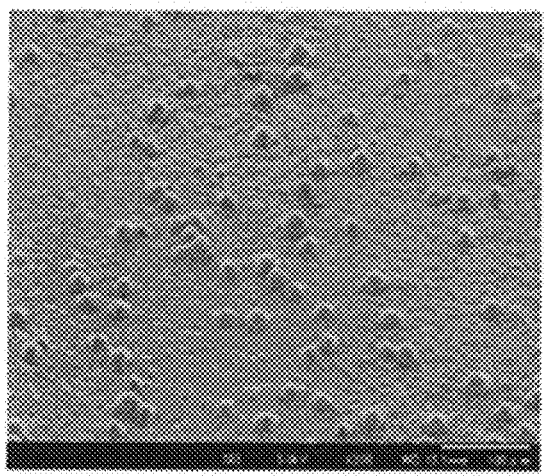
FIG. 1B is an SEM image showing a surface of a matt release layer of FIG. 1A magnified 200 times (partially enlarged view 1-1)

FIG. 1B is an SEM image showing the surface of the matt release layer 103 magnified 200 times (partially enlarged view 1-1). As shown in FIG. 1B, it can be seen that the surface of the matt release layer 103 has a convex shape of an acrylic bead shape having the large particle diameter of 20 μm. Additionally, fine convex portions made of the fillers having an average particle diameter of 4.5 μm and an average particle diameter of 1.5 μm are randomly formed between the acrylic beads having an average particle diameter of 20 μm in this surface state.

Figure 1C:
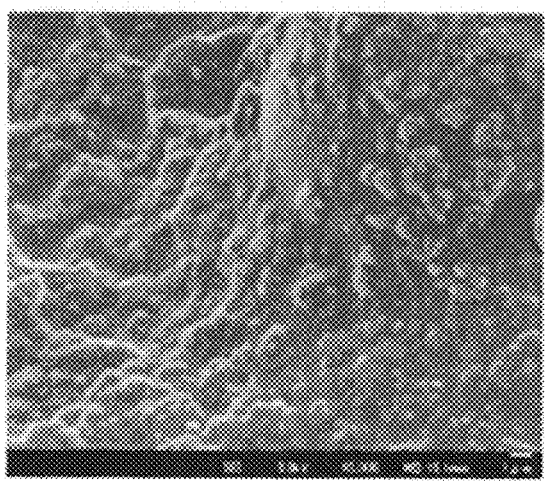
FIG. 1C is an SEM image obtained by further enlarging FIG. 1B for observation at a magnification of 5000 times (partially enlarged view 1-2)

FIG. 1C is an SEM image obtained by further enlarging FIG. 1B for observation at a magnification of 5000 times (partially enlarged view 1-2). Description will be made with reference to the partially enlarged view 1-2 of FIG. 1C. As can be seen from the partially enlarged view 1-2, the periphery of the acrylic filler having an average particle diameter of 20 μm is randomly covered with the silica particles having an average particle diameter of 4.5 μm and an average particle diameter of 1.5 μm. As a result, the surface of the matt release layer 103 has no smooth surface remaining between the convex portions of the acrylic filler and can be formed into a state of being filled with fine convex portions. As a result, a smooth surface is eliminated on the surface of the matt release layer 103, and when external light is applied to the surface of the matt release layer 103, the reflected light is finely dispersed to create a scattering state, so that a matte surface can be formed. The surfaces of these fillers different in size contained in the matt release layer 103 are covered with a release resin used for the matt release layer 103, i.e., a melamine resin, so that a film is formed. Therefore, the fillers themselves are not exposed from the melamine resin. This enables the matte release layer 103 to maintain the originally required releasing function even if the complex convex portions different in size are formed on the surface.

For the filler added to the matt release layer 103, particles having an average particle diameter within a range of 0.5 μm to 30 μm may be used. By selecting two or more types including one or more types of 0.5 to 2 μm and one or more types of 4 to 8 μm in average particle diameter, a matte surface can be obtained with a glossiness of 10% or less at 85°, which is the same as the matt feeling of the original wood surface. By using both a filler of 0.5 μm to 2 μm and a filler of 4 μm to 8 μm in average particle diameter, large and small convex portions can randomly be formed on the surface of the matt release layer 103 without gaps. Therefore, a smooth surface is eliminated from the surface of the matt release layer 103 to create a surface with little specular reflection light over a wide viewing angle when external light is applied to the surface, and the glossiness can be reduced to 10% or less at all of 20°, 60°, and 85° evaluated with a glossiness meter. Since an average value of surface roughness Rz of the uneven board 4 is 15 μm to 30 μm, one or more fillers having an average particle diameter of 15 μm to 30 μm may be selected and added so as to give an uneven tactile sensation when touched by hand. Regarding the ranges of size of the filler described above, if the average particle diameter of the filler is smaller than 0.5 μm, the size for forming fine convex portions for scattering external light is insufficient even if the filler is added, so that a smooth portion is easily formed. If the average particle diameter of the filler is larger than 30 μm, the filler is too large on the surface of the matt release layer 103, which makes it difficult to cover the filler larger than 30 μm with the resin forming the release layer. Therefore, the filler larger than 30 μm is easily exposed from the resin of the matt release layer 103, which causes the filler larger than 30 μm to drop off from the matt release layer 103. The filler larger than 30 μm dropping off from the matt release layer 103 scatters to other places and causes a defect due to a foreign matter in a subsequent step. However, the size of the filler to be added, the type to be added, and the addition amount may be out of the range depending on the purpose and are not particularly limited as long as the same effect is obtained.

A total amount of the fillers different in size in the matt release layer 103 may be mixed with a resin forming the release layer within a range of 3 wt % to 45 wt %. An amount less than 3 wt % cannot provide a sufficient effect for forming the convex portions for the tactile sensation and the convex portions for the light scattering on the matt release layer 103. On the other hand, if the amount is greater than 45 wt %, an increased viscosity deteriorates the dispersibility between the filler and the resin when a coating material for applying the matt release layer 103 to the base film 102 is produced, which makes uniform wet coating difficult on the base film 102. The fillers are added in a total addition amount within the range and at an addition ratio of the fillers different in size maintaining a relational expression: the weight of fillers having an average particle diameter of 15 μm to 30 μm≥the weight of fillers having an average particle diameter of 4 μm to 8 μm>weight of fillers having an average particle diameter of 0.5 μm to 2 μm in weight ratio.

In the first embodiment, the fillers are added at 13 wt % in total at the proportions of the filler having an average particle diameter of 15 μm to 30 μm of 6 wt %, the filler having an average particle diameter of 4 μm to 8 μm of 5 wt %, and the filler having an average particle diameter of 0.5 μm to 2 μm of 2 wt %. If the filler having an average particle diameter of 4 μm to 8 μm is added more than the filler having an average particle diameter of 15 μm to 30 μm, the convex shapes for giving a tactile sensation are not sufficiently formed, and the convex shapes formed by the filler having an average particle diameter of 15 μm to 30 μm are covered with the filler having an average particle diameter of 4 μm to 8 μm, so that sufficient convex shapes for giving a tactile sensation are hardly formed. Even though the filler having an average particle diameter of 0.5 μm to 2 μm is added more than the filler having an average particle diameter of 4 μm to 8 μm, the convex shapes for light scattering smaller than the convex shapes having an average particle diameter of 15 μm to 30 μm are not sufficiently formed therebetween. Regarding the addition ratio of the filler having an average particle diameter of 4 μm to 8 μm and the filler having an average particle diameter of 0.5 μm to 2 μm, for example, when the addition ratio of the filler having an average particle diameter of 4 μm to 8 μm is 100 wt %, the addition ratio of the filler having an average particle diameter of 0.5 μm to 2 μm may be between 20 to 60 wt %.

However, the ratio is not necessarily be limited to the range as long as concave portions providing the same effect can be formed on the surface of the hard coat layer or the protective layer 104 even if the ratio is out of the range.

<Hard Coat Layer>

The hard coat layer 104 formed on the matt release layer 103 will be described. A protective layer may be formed instead of the hard coat layer 104. The hard coat layer 104 has a role of protecting the surface of the uneven board when the hard coat layer 104 is transferred to the surface of the uneven board. An ultraviolet-curing after-cure type acrylic resin is generally used for the hard coat layer 104; however, the present disclosure is not limited thereto. For example, a precure type UV-curing acrylic resin, a thermal-drying one-pack type acrylic resin, a thermal-drying two-pack curing type urethane acrylic resin, and an EB (Electron Beam) curing type acrylic resin cured by electron beam may be used and may appropriately be selected depending on the purpose. Other materials may be used without problem as long as the intended effect is obtained. When an after-cure type material is used, application of ultraviolet or EB may be performed in a step after a wooden decorative board is molded and the base film 102 and the matt release layer 103 are peeled in general. The reason is that when the hard coat layer 104 is not completely cured at the time of molding of the wooden decorative board, the hard coat layer 104 has more favorable followability at the time of molding and is hardly broken. However, the application is not necessarily limited to the final step, and if applying ultraviolet or EB earlier is more favorable depending on use, the layer may be cured at an appropriate timing even before molding.

The average thickness of the hard coat layer 104 may be 2 μm to 15 μm, further may be 5 μm to 10 μm. The average thickness of the hard coat layer 104 less than 2 μm weakens the protection function of the uneven board surface. The average thickness exceeding 15 μm tends to deteriorate the followability at the time of molding into a curved surface shape etc. Moreover, the large convex portions giving the tactile sensation on the matt release layer 103 are hardly sufficiently formed on the surface of the hard coat layer 104. However, a film thickness out of the range causes no problem and is not particularly limited as long as the intended effect.

Functional fine particles may be added to the hard coat layer 104 as necessary. For example, the surface hardness and chemical resistance of the hard coat layer 104 can be increased by simultaneously adding acrylic cross-linked zirconia particles having an average particle diameter of 50 nanometers (nm).

The hard coat layer 104 formed in the first embodiment had an average thickness of 5 μm. The hard coat layer 104 is formed on the matt release layer 103 to which multiple types of fillers are added so that multiple uneven portions having different sizes are randomly (irregularly) formed on the surface. Therefore, on the surface of the hard coat layer 104, concave portions inverted from the convex portions formed on the matt release layer 103 are formed on the surface of the hard coat layer 104.

Figure 1D:
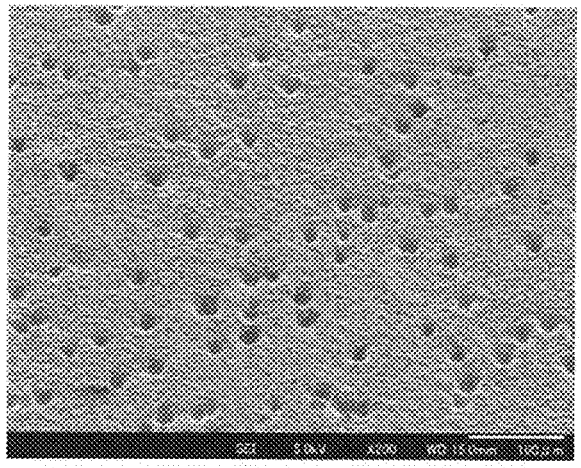
FIG. 1D is an SEM image showing a surface of a hard coat layer peeled from the matt release layer magnified 200 times by SEM (partially enlarged view 1-3)
Figure 1E:
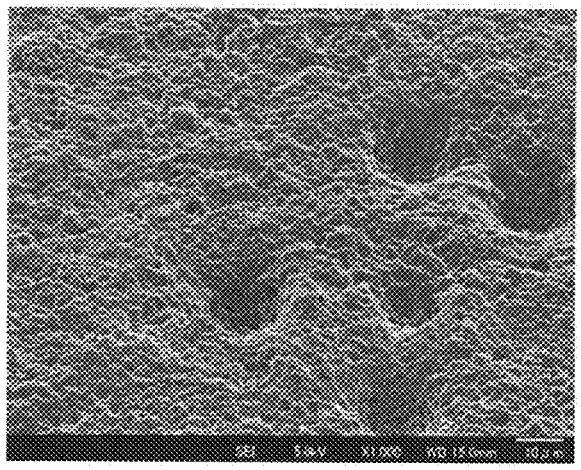
FIG. 1E is an SEM image showing the surface of the hard coat layer magnified 1000 times (partially enlarged view 1-4)

FIG. 1D is an SEM image showing a surface of the hard coat layer 104 peeled from the matt release layer 103 magnified 200 times by SEM (partially enlarged view 1-3). FIG. 1E is an SEM image showing the surface of the hard coat layer 104 magnified 1000 times (partially enlarged view 1-4). In the first embodiment, the convex portions are formed on the matt release layer 103 by the filler having an average particle diameter of 20 μm added to the matt release layer 103 for improvement of hand feeling, and as shown in the partially enlarged view 1-4, the concave portions having a reverse pattern are formed on the surface of the hard coat layer 104. It can be seen from the partially enlarged view 1-4 that due to the convex portions formed by the other fillers having average particle diameters of 4.5 μm and 1.5 μm added to the matt release layer 103, fine concave portions are randomly (irregularly) formed in the same way to fill spaces between the concave portions formed by the filler having an average particle diameter of 20 μm on the surface of the hard coat layer 104.

This provides the same effect as the matte release layer 103 in terms of the matte feeling of the surface of the hard-coat layer 104.

Regarding a relationship of height difference or depth of the uneven shapes formed on the surface of the hard coat layer 104, when H1 is the size of uneven portions formed by xylem vessels on the original surface of the uneven board 4, H2 is the size of the concave portions formed by the filler having an average particle diameter of 15 μm to 30 μm formed for giving the uneven tactile sensation on the surface of the hard coat layer 104, and H3 is the size of the concave portions for light scattering respectively formed by the fillers having an average particle diameter of 4 μm to 8 μm and an average particle diameter of 0.5 μm to 2 μm, a magnitude relationship of H1>H2>H3 is established.

The size of the xylem vessels on the original surface of the uneven board 4 varies depending on types of wood including ring-porous wood with large vessels and diffuse-porous wood with xylem vessels smaller than the ring-porous wood, and the diameter of the xylem vessels is in a range of 20 μm to 400 μm on average. As a result of verification of a range of the size H1 of uneven portions in which a person can easily feel the tactile sensation of surface roughness of the uneven board 4, the range was 70 μm to 400 μm.

<Anchor Layer>

The anchor layer 105 is a layer playing a role of increasing the adhesion between the hard coat layer 104 and another functional layer. For the anchor layer 105, a two-pack curing type urethane acrylic resin etc. are typically used from the viewpoint of weather resistance, adhesion, heat resistance, etc., or two-pack type vinyl chloride/acetate copolymers having urethane bonds, acrylic resins, or composite resin materials acquired by mixing the resins may be used depending on use. The average thickness may be between 2 μm and 5 μm. The average thickness less than 2 μm makes it difficult to obtain sufficient adhesion between layers, and even when the thickness is made greater than 5 μm, the adhesion is not particularly changed. Moreover, the thickness greater than 5 μm exceeds the dry film thickness applicable neatly in appearance with a gravure coater etc., makes a drying time of coating material longer, increases costs of materials and processing, and therefore is not appropriate. However, the thickness may not be limited to the range as long as the intended effect is obtained depending on use even if the thickness is out of the range. In the first embodiment, the layer having an average thickness of 3 μm was formed. However, the thickness may not particularly be limited to the range as long as the intended effect is obtained depending on use even if the thickness is out of the range.

<UV Cut Layer>

The UV cut layer 106 has a role of preventing discoloration of the uneven board 4 due to an influence of ultraviolet. The UV cut layer 106 may be made of a material in which an ultraviolet absorber and an antioxidant are incorporated in a molecular chain as a functional group, or a material in which an ultraviolet absorber and an antioxidant are separately added to a highly weather-resistant resin.

An average thickness of the UV cut layer 106 may be between 2 μm and 10 μm.

If the average thickness of the UV cut layer 106 is less than 2 μm, a UV cut function is not sufficiently exhibited, and if the average thickness is greater than 10 μm, the yellow color unique to the UV cut layer becomes strong and affects the appearance, and therefore, the layer may be formed within the range. However, the average thickness is not particularly limited to the range as long as the same effect is obtained depending on the purpose even if the average thickness is out of the range. The UV cut layer 106 formed in the first embodiment is made of a material in which an ultraviolet absorber and an antioxidant are incorporated into a molecular chain as a functional group, and the average thickness is 4 μm.

<Uneven Board Adhesive Layer>

The uneven board adhesive layer 107 has a role of bonding the UV cut layer 106 and the uneven board 4. The uneven board adhesive layer 107 can be made of vinyl chloride/acetate copolymer resin, acrylic resin, urethane acrylic resin, polyolefin resin, etc., which are classified into thermoplastic resin, two-pack curing type resin, ultraviolet-curing resin, thermosetting resin, EB-curing resin. However, the material may not particularly be limited as long as the transfer layer 101 and the uneven board 4 can be bonded, and materials other than those described above may be used without problem. For example, the uneven board adhesive layer 107 may not be applied to the transfer film 100 in advance, and a thermoplastic or thermosetting hot melt sheet may be inserted between the transfer layer 101 side of the transfer film 100 and the uneven board 4 immediately before the uneven board 4 is formed into a sheet, so that the transfer layer 101 of the transfer film 100 and the uneven board 4 are bonded.

Other than the hot melt sheet, for example, an adhesive with a separator may be used instead of the uneven board adhesive layer 107. These adhesive materials may be used in combination to improve the adhesion. An average thickness of the uneven board adhesive layer 107 may be 3 μm to 50 μm. If the thickness of the uneven board adhesive layer 107 is less than 3 μm, the function of bonding the UV cut layer 106 and the uneven board 4 becomes weak, and sufficient adhesiveness cannot be obtained. The reason is that, since the uneven board 4 has a porous structure, a portion of the uneven board adhesive layer 107 easily enters the uneven board 4 when bonded, and the sufficient uneven board adhesive layer 107 is less likely to remain between the transfer layer 101 and the uneven board 4, which makes it difficult to ensure a film thickness necessary for securing the strength of the uneven board adhesive layer 107. When the hot melt sheet is used as the uneven board adhesive layer 107, the thickness is mainly 35 μm or more, and using a sheet thicker than 50 μm is meaningless since the bonding function is not significantly change only the manufacturing cost increases. However, the thickness may not particularly be limited to the range as long as the intended effect is obtained even if the thickness is out of the range or further thickening the uneven board adhesive layer 107 is advantageous for other purposes.

The transfer film 100 may have another functional layer added thereto or a layer removed therefrom, or may be formed in a different layer configuration, as necessary. For example, a hydrophilic layer imparting an antifouling function to the surface of the hard coat layer may be added to the transfer film 100. Conversely, if the weather resistance and the adhesion can easily be ensured, the anchor layer 105 and the UV cut layer 106 may be eliminated to reduce the number of layers of the transfer film 100 and reduce the cost, and the necessary functional layers can appropriately be selected depending on the purpose and use. The minimum functional layers required for the transfer film are the base film 102, the matte release layer 103, the hard coat layer or the protective layer 104, and the uneven board adhesive layer 107 for bonding to the uneven board.

An average thickness of the transfer layer 101 may be 5 μm to 80 μm, further may be 10 μm to 50 μm. If the average thickness of the transfer layer 101 is less than 5 μm, the minimum required functions cannot sufficiently be achieved in the layers. On the other hand, the thickness greater than 80 μm deteriorates the followability to the uneven shape on the surface of the uneven board 4 when the transfer film 100 is transferred to the uneven board 4. Therefore, the uneven portions due to the xylem vessels on the surface of the uneven board are less likely to be reflected as a similar shape on the surface of the hard coat layer 104, or the transfer layer 101 made thicker visually enhances a depth feel, so that the original texture of the uneven board is hardly maintained.

<Manufacturing Process of Wooden Decorative Board>

Figure 2A:
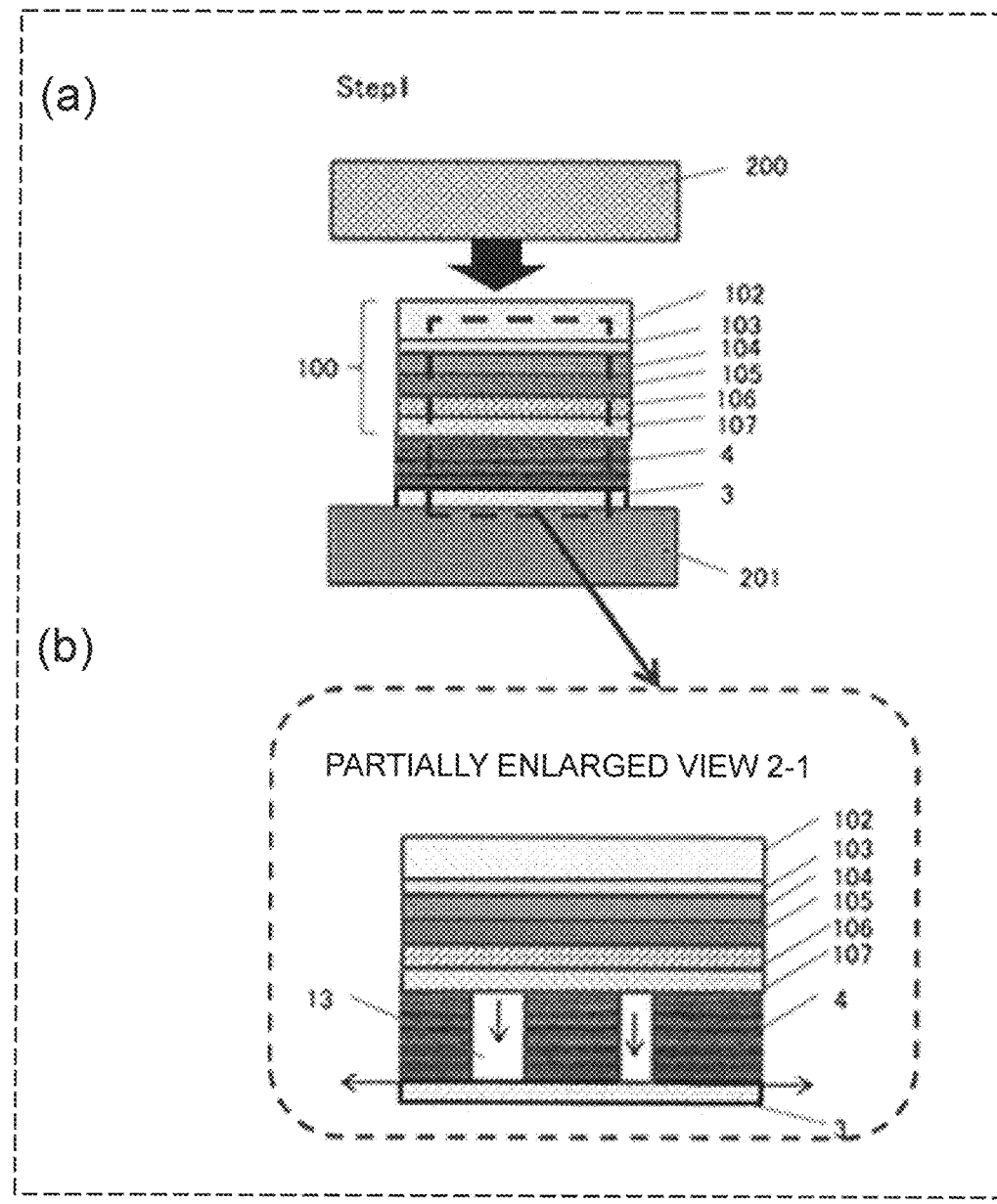
FIG. 2A is a schematic cross-sectional view for explaining step 1 of a method for manufacturing a wooden decorative board according to the first embodiment.
Figure 2B:
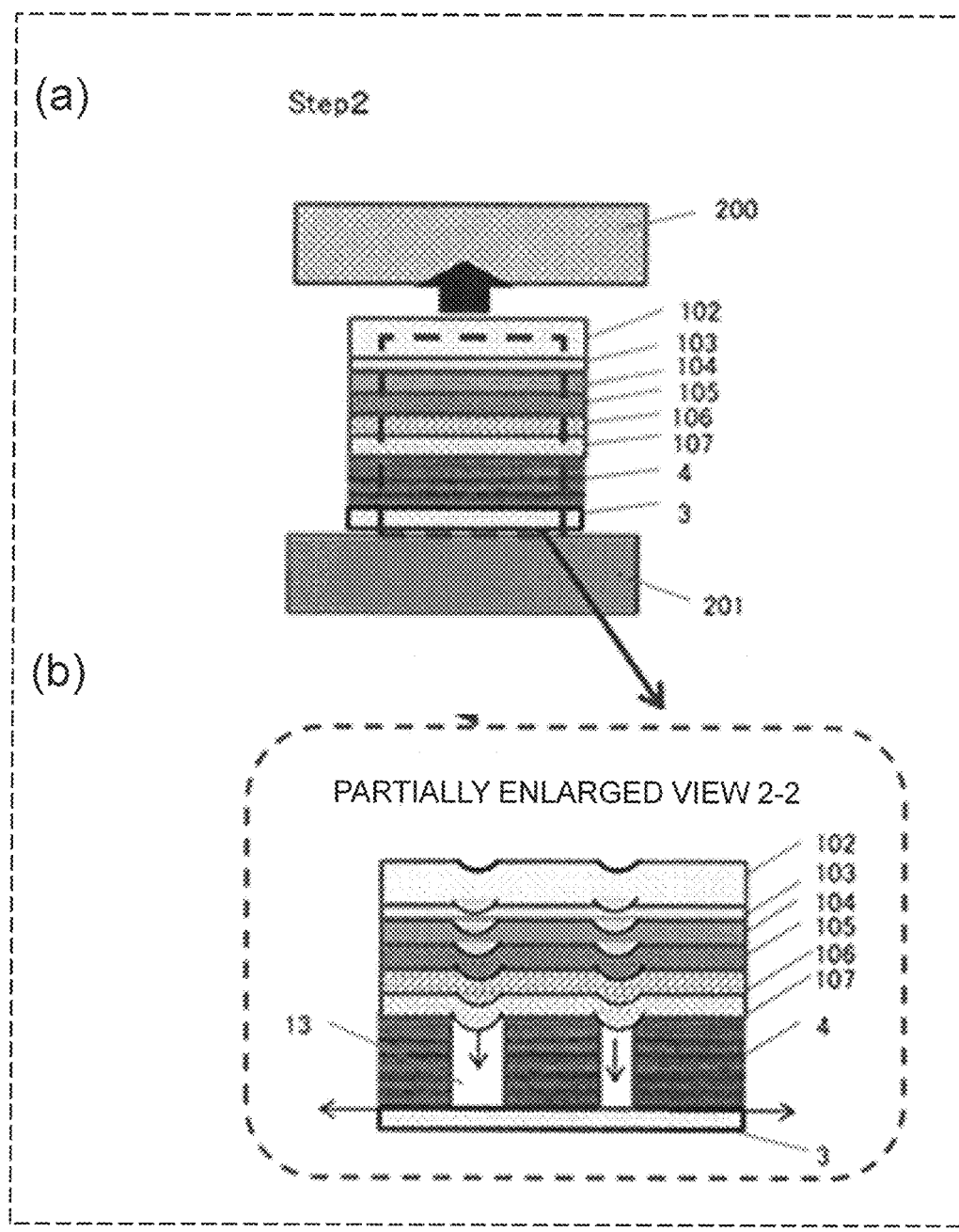
FIG. 2B is a schematic cross-sectional view for explaining step 2 of the method for manufacturing a wooden decorative board according to the first embodiment.
Figure 2C:
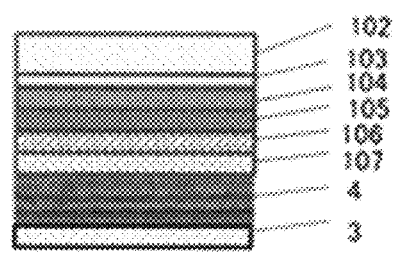
FIG. 2C is a schematic cross-sectional view for explaining step 3 of the method for manufacturing a wooden decorative board according to the first embodiment.

FIG. 2A(a) is a schematic cross-sectional view for explaining step 1 of a method for manufacturing a wooden decorative board according to the first embodiment. FIG. 2A(b) is a cross-sectional enlarged view of the transfer film 100 and the uneven board 4 (partially enlarged view 2-1). FIG. 2B(a) is a schematic cross-sectional view for explaining step 2 of the method for manufacturing a wooden decorative board according to the first embodiment. FIG. 2B(b) is a cross-sectional enlarged view of the transfer film 100 and the uneven board 4 (partially enlarged view 2-2). FIG. 2C is a schematic cross-sectional view for explaining step 3 of the method for manufacturing a wooden decorative board according to the first embodiment. In FIGS. 2A, 2B, and 2C, the same constituent elements as FIGS. 1A to 1E, 5, and 6 are denoted by the same reference numerals and will not be described. FIGS. 2A, 2B, and 2C are schematic cross-sectional views for explaining a process of bonding the transfer film 100 and the uneven board 4 by using hot pressing to manufacture a wooden decorative board.

(1) First, at step 1 shown in FIG. 2A(a), a first press mold 200 and a second press mold 201 for pressing are heated to a predetermined temperature in advance, and the sheet transfer film 100 and the sheet uneven board 4 having the support 3 attached to one surface of the uneven board 4 are sandwiched (FIG. 2A(a)). As a result, the uneven board adhesive layer 107 of the transfer film 100 and the uneven board 4 are heated and pressure-bonded. Regarding the support 3, the uneven board 4 having the support 3 attached to one side of the uneven board 4 in advance may be used. If the support 3 is not attached to the uneven board 4 in advance, the support 3 may be bonded to the uneven board 4 at the same time at the step of bonding the sheet transfer film 100 to the uneven board 4. Specifically, the support 3 bondable to the uneven board 4 or the support 3 with an adhesive applied to one side may be disposed on the side of the uneven board 4 opposite to the surface on which the transfer film 100 is disposed, or a hot melt sheet etc. may be disposed between the uneven board 4 and the support 3. As a result, the support 3 can be bonded to the uneven board 4 at the same time at the step of bonding the transfer film 100 and the uneven board 4. The support 3 may be a nonwoven fabric or a film or may be provided with a porous nonwoven fabric layer having an adhesive function. The support 3 may be selected depending on use. When the uneven board 4 is a continuous sheet, the transfer film 100 may be supplied and bonded from a roll instead of a sheet. In this first embodiment, a nonwoven fabric was used for the support 3.

The molds used for the hot pressing may be metal molds, wood molds, or resin molds and may not be limited as long as the same effect is obtained even if the molds re made of other materials.

The partially enlarged view 2-1 (FIG. 2A(b)) of step 1 is a cross-sectional enlarged view of the transfer film 100 and the uneven board 4. At the time of sandwiching between the first press mold 200 and the second press mold 201 as shown in the partially enlarged view 2-1, an air layer may be included between the transfer film 100 and the uneven board 4. When the uneven board 4 is pressurized from the transfer film 100 side by the first press mold 200, the air layer between the transfer film 100 and the uneven board 4 released along the surface of the uneven board 4 due to the pressurization by the first press mold 200. In this case, air contained inside xylem vessels 13 present on the surface of the uneven board 4 is also released. The inside of the xylem vessels 13 of the uneven board 4 is a portion where wood fibers are sparse and has a porous shape. Additionally, to facilitate the release of air, surfaces of molds used for hot pressing may be subjected to emboss processing to add uneven portions having a size facilitating the release of air. In the transfer film 100, the convex portions on the surface of the matt release layer 103 are also formed as convex portions in a similar shape on the surface of the final uneven board adhesive layer 107. This results in a structure allowing air to easily pass through between the fine convex portions on the surface of the uneven board adhesive layer 107 at the time of the hot pressing, so that a favorable bonding plane can be obtained without the air trapped between the transfer film 100 and the uneven board 4.

(2) When the uneven board adhesive layer 107 of the transfer film 100 and the uneven board 4 are heat-bonded by pressurization of the first press mold 200, the uneven board adhesive layer 107 of the transfer film 100 softens due to heat conduction from the first press mold 200. As a result, a portion of the uneven board adhesive layer 107 of the transfer film 100 enters the xylem vessels 13 of the uneven board 4. In this case, the air inside the xylem vessels 13 of the uneven board 4 is also activated and made active due to heating by the first press mold 200 and the second press mold 201, and the entry of the uneven board adhesive layer 107 of the transfer film 100 pushes out a portion of the air in the xylem vessels 13 of the uneven board 4. In this case, as shown in the partially enlarged view 2-1 (FIG. 2A(b)), the air in the xylem vessels 13 moves from the xylem vessels 13 in the direction of arrows 1, and a portion of the air is released from the second press mold 201 side of the uneven board 4. As a result, the layers of the transfer film 100 on the xylem vessels 13 of the uneven board 4 starting from the uneven board adhesive layer 107 allows a portion of the uneven board adhesive layer 107 to enter the inside of the xylem vessels 13 of the uneven board 4.

After sufficient heat and pressure are applied to the transfer film 100 and the uneven board 4 at step 1 shown in FIG. 2A, the first press mold 200 is operated and moved to above the transfer film at step 2 shown in FIG. 2B. In this case, as a result of the hot pressing at step 1, in the partially enlarged view 2-2 of the transfer film 100 and the uneven board 4 shown in the partially enlarged view 2-2 (FIG. 2B(b)) at step 2, a portion of the uneven board adhesive layer 107 of the transfer film 100 has entered the inside of the xylem vessels 13 of the uneven board 4. Therefore, the other layers of the transfer film 100 are also pulled and slightly deformed into the shape of the uneven board adhesive layer 107 entering the xylem vessels 13 of the uneven board 4. As a result, the uneven shape formed by the xylem vessels 13 on the surface of the uneven board 4 forms uneven portions in a similar shape in the transfer layer of the transfer film 100.

(3) Final Step 3 is a step of taking out the wooden decorative board having the transfer film 100 and the uneven board 4 in an integrated state from inside the mold.

The surface of the matt release layer 103 in the transfer film 100 subjected to the manufacturing step has the multiple convex portions not shown smaller than the size of the xylem vessels 13 of the uneven board 4. Therefore, when the uneven board 4 is indirectly heated and pressurized from the base film 102 of the transfer film 100 by the first press mold 200, the convex portions not shown formed on the surface of the matt release layer 103 of the transfer film 100 disperses the pressure applied to the surface of the uneven board 4, so that a pressurizing force is dispersed by the convex portions of the matt release layer 103. As a result, the uneven shape formed by the xylem vessels 13 on the surface of the uneven board 4 is hardly crushed by the pressurizing force of the hot pressing. Since the uneven shape formed by the xylem vessels 13 on the surface of the uneven board 4 is hardly crushed, the transfer layer 101 of the transfer film 100 follows the uneven shape formed by the xylem vessels 13 of the uneven board 4. Therefore, the uneven shape along the xylem vessels 13 of the uneven board 4 is transferred in a similar shape to the surface of the transfer layer 101. To improve the followability of the transfer film 100 to the uneven board 4, press molds made of a material other than metal such as a Teflon (registered trademark) material or a heat-resistant resin material may be used as the first press mold 200 and the second press mold 201 during hot pressing. This increases the flexibility of the press molds as compared to when a metal material is used, and the transfer film 100 is enhanced in the followability to the uneven board 4 at the time of heating and pressurizing. Additionally, by applying a resin impregnation treatment to the uneven board 4 in advance, wood fiber inside the uneven board 4 is loosened by an impregnating resin, so that the uneven board 4 itself is improved in the flexibility, which gives higher followability to the transfer film 100 and the uneven board 4 during hot pressing. Examples of the resin for impregnating the uneven board 4 include water-based polyethylene glycol (PEG), acrylic, polyvinyl alcohol, etc., and an appropriate resin may be selected depending on use. For example, a thermoplastic resin, a thermosetting resin, a two-pack curing resin, an ultraviolet/EB curing precure type resin, or an ultraviolet/EB curing after-cure type resin may be used without problem as long as the inside of the uneven board 4 can be impregnated therewith. Resin impregnation is not essential, and whether resin impregnation is performed may be determined as needed. The transfer film 100 and the uneven board 4 or the support 3 may be bonded by a processing method other than the hot pressing, such as a vacuum heat laminator, a vacuum forming method, a pressure forming method, heating by vacuum pressure forming, or a pressurizing method.

In the case of a vacuum heat laminator, depressurization due to vacuuming further facilitates the release of the air in the xylem vessels 13 of the uneven board 4 and the air between the transfer film 100 and the uneven board 4 described with reference to the partially enlarged view 2-1 (FIG. 2A(b)) and the partially enlarged view 2-2 (FIG. 2B(b)), and a portion of the uneven board adhesive layer 107 of the transfer film 100 is more easily drawn into the xylem vessels 13 of the uneven board 4. As a result, the transfer film 100 more easily follow the uneven shape of the xylem vessels 13 on the surface of the uneven board 4, and the uneven shape similar to the xylem vessels 13 formed on the surface of the transfer layer 101 of the transfer film 100 is more prominently formed.

FIG. 3(a) is a cross-sectional view showing a layer structure of the wooden decorative board according to the first embodiment, and FIG. 3(b) is an SEM image of the surface of the hard coat layer 104 serving as an outermost surface of the transfer layer 101 magnified 200 times (partially enlarged view 3-1). In FIGS. 3(a) and 3(b), the same constituent elements as FIGS. 1A to 2C, 5, and 6 are denoted by the same reference numerals and will not be described. A wooden decorative board 109 shown in FIG. 3(a) is in a state after the base film 102 and the matt release layer 103 of the transfer film 100 are removed. specifically, the transfer layer 101 of the transfer film 100 is located on uneven portions 108 formed by the xylem vessels 13 on the surface of the uneven board 4, and an uneven shape similar to the uneven shape formed by the xylem vessels 13 on the uneven board 4 is formed on the outermost surface of the transfer layer 101 as the uneven portions 108. The size of the uneven portions 108 is H1. Referring to the partially enlarged view 3-1 of FIG. 3(b), concave portions having a reverse pattern of the convex portions formed on the matt release layer 103 are formed among the uneven portions (H1) having a shape similar to the xylem vessels 13. As a result, in the wooden decorative board 109, concave portions smaller than the uneven portions of the xylem vessels 13 are randomly (irregularly) formed on the surface of the hard coat layer 104. The size of the concave portions is H2. In FIG. 3(b), H3 is the size of the concave portions for light scattering formed by the finer filler is H3. This leads to formation of the hard coat layer 104 that is a matte surface giving a tactile sensation of a surface touched by hand and scattering external light with the surface of the hard coat layer 104 while leaving the uneven portions 108 due to the original vessels of the uneven board 4. As a result, the wooden decorative board ensures reliability while maintaining the original tactile sensation of the surface of the uneven board 4 and the matte surface.

An average thickness of the uneven board 4 to be used is 0.1 mm to 0.7 mm, further, may be 0.2 mm to 0.6 mm. If the thickness is less than 0.1 mm, the uneven board 4 is thin and easily broken during handling. the thickness greater than 0.7 mm deteriorates the followability as a sheet during molding. However, the thickness of the uneven board out of the range causes no problem as long as the intended effect is obtained.

<Manufacturing Process of Transferring Wooden Decorative Board to Surface of Molded Article by Insert Molding>

Steps of the manufacturing method for transferring the wooden decorative board 109 according to the first embodiment to a surface of a molded article by insert molding will be described with reference to FIGS. 4A-1 to 4D. In FIGS. 4A-1 to 4D, the same constituent elements as FIGS. 1 to 3, 5, and 6 are denoted by the same reference numerals and will not be described.

(a) At the step shown in FIG. 4A-1, first, the wooden decorative board 109 is disposed between a fixed press mold 2A and a movable press mold 1A for preforming. The wooden decorative board 109 in this case is a sheet. At this step, the wooden decorative board 109 is disposed with the transfer layer 101 facing the fixed mold 2A.

Figures 2, 4A:
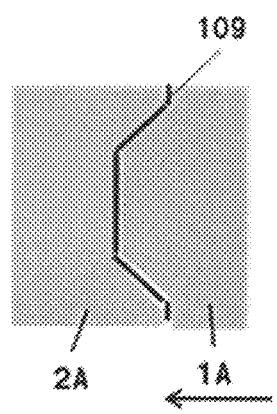
Figures 3, 4A:
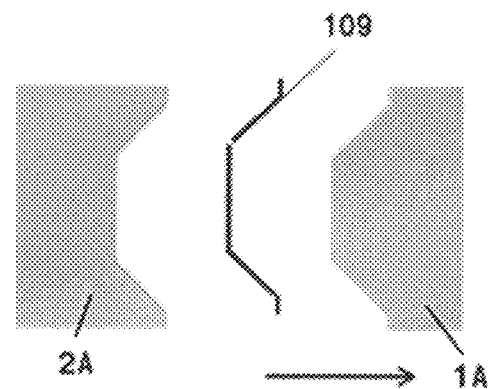

(b) At the step shown in FIG. 4A-2, the movable mold 1A is then moved for mold closing to preform the wooden decorative board 109.

(C) Subsequently, at the step shown in FIG. 4A-3, the movable mold 1A is returned, and the preformed wooden decorative board 109 is taken out from the mold. At this step, the wooden decorative board 109 may be allowed to contain moisture in advance to loosen wooden fibers in the uneven board 4 of the wooden decorative board 109 with moisture, so that the wooden decorative board 109 easily follows the preform molds during preforming. Moisture or water vapor may be applied to the wooden decorative board 109 at the same time as preforming to loosen the wooden fibers in the uneven board 4 in the wooden decorative board 109 or impart flexibility to the wooden decorative board 109. If moisture or water vapor cannot be used due to a problem with the wooden decorative board 109 or molding process, the inside of the uneven board 4 may be impregnated with a resin in advance to improve the flexibility of the uneven board 4 without using water.

Figures 1, 4B:
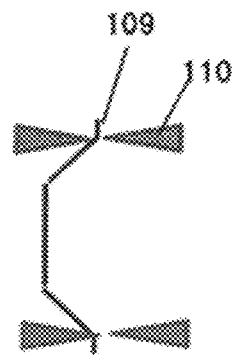
Figures 2, 4B:

(d) At the step shown in FIG. 4B-1, the wooden decorative board 109 is then trimmed with a dedicated cutter 110 in an unnecessary portion on an end surface of the wooden decorative board 109.

(e) At the step shown in FIG. 4B-2, the trimming is completed, and the wooden decorative board 109 for insert molding is completed.

Figures 1, 4C:
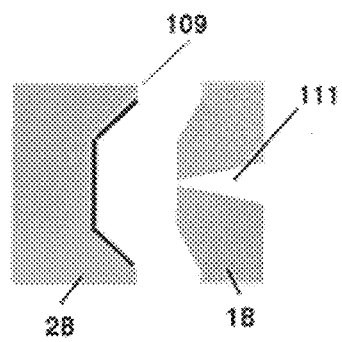
Figures 2, 4C:
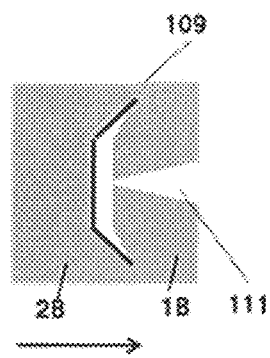
Figures 3, 4C:
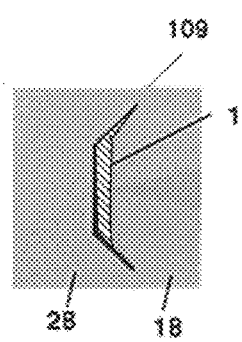

(f) At the step shown in FIG. 4C-1, the preformed wooden decorative board 109 is then disposed in the movable mold 2B and the fixed mold 1B for insert molding. At this step, the wooden decorative board 109 is disposed with the transfer layer 101 facing toward the movable mold 2B having a suction hole formed at a position not shown in the figures. At this step, the preformed wooden decorative board 109 is sucked through the suction hole not shown in the figures.

(g) At the step shown in FIG. 4C-2, the movable mold 2B is moved for mold closing.

Figure 3:
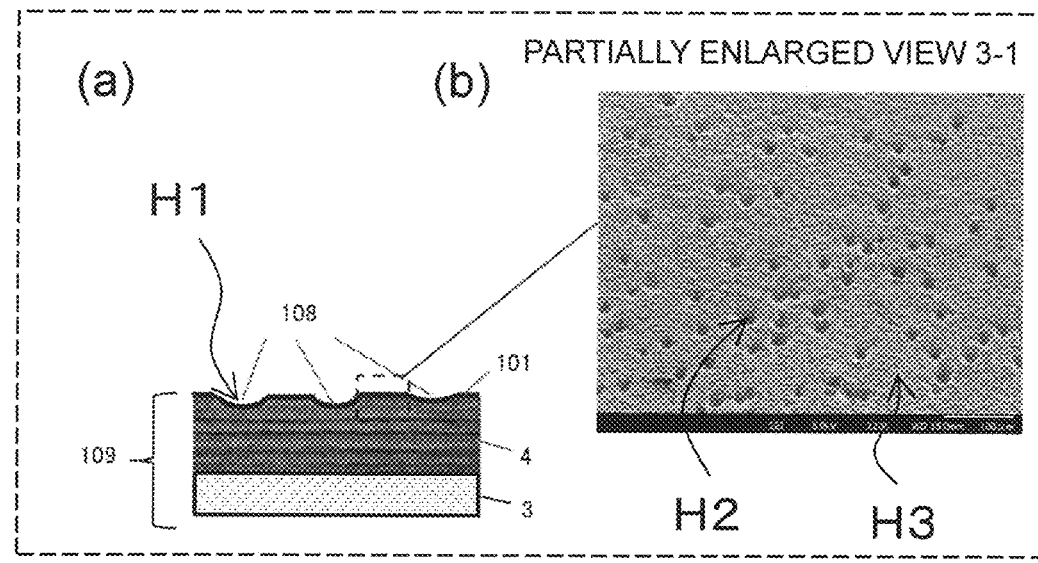
FIG. 3 (a) is a cross-sectional view showing a layer structure of the wooden decorative board according to the first embodiment; and (b) is an SEM image of a surface of the hard coat layer serving as an outermost surface of a transfer layer magnified 200 times (partially enlarged view 3-1)

(h) At the step shown in FIG. 4C-3, an injection molding resin is poured into the molds from a gate 111 opened in the fixed mold 1B and is bonded to a second adhesive layer disposed in advance on a surface opposite to the transfer layer 101 of the wooden decorative board 109.

Figures 4, 4C:
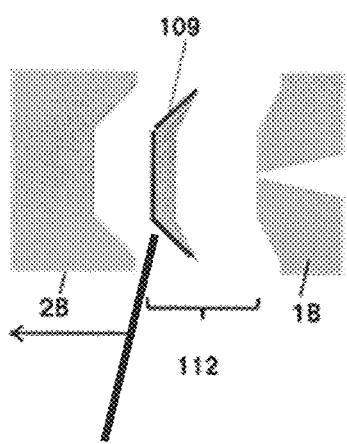
Figure 4D:
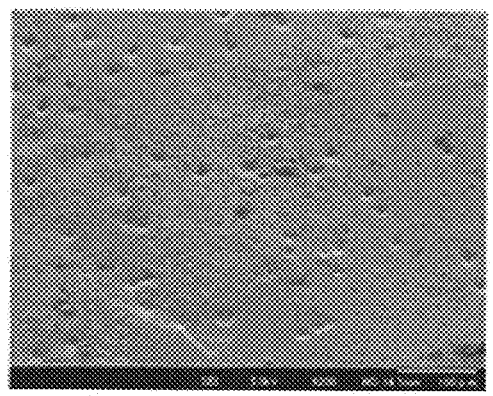
FIG. 4D is an SEM image showing the hard coat layer on a surface of the insert-molded article magnified 200 times (partially enlarged view 4-1)

(i) At the step shown in FIG. 4C-4, the molds are opened, and an insert-molded article 112 integrally molded with the wooden decorative board 109 is taken out from the molds with an ejection pin not shown. This step is repeated for mass production. At the insert molding step, as in the preform step, moisture may be given to the wooden decorative board to increase the flexibility and improve the followability to the insert molds. The flexibility of the wooden decorative board 109 may be improved by using the uneven board 4 impregnated with resin in advance.

FIG. 4D is an SEM image showing the hard coat layer 104 on the surface of the insert-molded article 112 magnified 200 times (partially enlarged view 4-1). As shown in FIG. 4-1, when the wooden decorative board 109 is used, the fine concave portions on the surface of the hard coat layer 104 after molding are hardly crushed. Therefore, the tactile sensation of the fine concave portions on the surface of the hard coat layer 104 and the fine concave portions scattering external light are likely to remain, and the matte surface can be maintained.

The concave portions for the tactile sensation formed by the matt release layer 103 on the surface of the hard coat layer 104 have a concave shape and are therefore hardly crushed by the pressure during injection molding. The fine concave portions for scattering light are also randomly arranged on the surface of the hard coat layer 104 and are not in a uniform plane in which the uneven portions 108 formed by the xylem vessels on the uneven board surface or the smaller concave shape for tactile sensation are present. Therefore, the pressure during injection molding is easily dispersed on the surface of the hard coat layer 104, and the fine concave portions for maintaining the matte surface are hardly crushed and are easily maintained.

If it is desired to more precisely maintain the uneven shape on the surface of the wooden decorative board 109 and the molded article has a relatively flat shape so that a deformation amount of the wooden decorative board 109 is relatively small, the uneven board 4 and the transfer film 100 are less deformations, and a difference of expansion/contraction is hardly generated between materials. Therefore, wrinkles generated due to the expansion/contraction of the transfer film 100 are hardly formed. Thus, no wrinkles are formed on the surface of the uneven board 4, and after the transfer film 100 and the uneven board 4 are bonded by hot pressing, the wooden decorative board 109 may be insert-molded while the base film 102 and the matt release layer 103 of the transfer film 100 are left without being peeled. Alternatively, the base film 102 with the matte release layer 103 may be peeled from an insert-molded article after completion of insert molding. As a result, regarding the concave shape formed on the transfer layer 101 on the surface of the insert-molded article 112 with the wood decorative board 109, the surface of the transfer layer 101 and the surface of the insert mold are not brought into direct contact during insert molding. Therefore, the concave portions formed on the surface of the transfer layer 101 become harder to crush, so that the insert-molded article 112 with the wooden decorative board 109 having the concave portions more precisely remaining on the surface can be obtained.

Other than insert molding, the wooden decorative board 109 may be subjected to trimming after performing as necessary and affixed to a molded article surface by hand or by using vacuum pressure forming etc. for decoration in subsequent processing.

Second Embodiment

In another method for more effectively maintaining the uneven shape on the surface of the wooden decorative board 109, a die having any embossing formed on the surface of the mold 2A or the mold 2B may be used on the uneven board 4 side to which the transfer layer 101 is transferred, at the steps shown in FIG. 4A-1 to FIG. 4A-3 or the insert molding step, i.e., steps shown in FIG. 4C-1 to FIG. 4C-4, or both steps.

This method is effective when the base film 102 and the matt release layer 103 of the transfer film 100 are first peeled off and only the transfer layer 101 is formed on the wooden decorative board 109 at the preform step or the insert molding step. Particularly, this method is effective means when the molded article shape has large curvature, or the molded article shape is a complicated three-dimensional shape, and wrinkles are generated due to a large difference in expansion/contraction ratio between the uneven board 4 and the base film 102 molded without peeling the base film 102 so that the wrinkles are transferred to the surface of the wooden decorative board 109 and cause an appearance defect.

The embossing formed on the mold surface may appropriately be formed by using etching or sandblasting to achieve the same roughness and glossiness as the surface of the matt release layer 103 of the transfer film 100. The etching is mainly used for forming large-sized uneven portions for tactile sensation, and the sandblasting is used for forming fine uneven portions for obtaining a matte surface. Multiple sizes of sand particles may separately be used in the sandblasting depending on processing conditions so as to randomly form fine uneven portions different in sizes as in the matt release layer 103. The embossing may be formed only by the sandblasting without using the etching. The present disclosure is not limited to the etching and the sandblasting as long as the same effect is obtained.

With this method, the embossing on the mold surface not shown in FIGS. 4A to 4C-4 can partially or entirely be formed on the surface of the transfer layer 101 by heating/pressurizing at the time of preforming or injection pressure at the insert molding step. This enables manufacturing of the insert-molded article 112 maintaining the uneven tactile sensation and the matte surface on the surface of the hard coat layer 104 of the final molded article.

The present disclosure includes appropriately combining any embodiments and/or examples out of the various embodiments and/or examples described above, and the effects of the respective embodiments and/or examples can be produced.

According to the wooden decorative board, the method for manufacturing the same, and the method for manufacturing a molded article using the same of the present disclosure, the original uneven tactile sensation, matte feeling, and apparent texture of the uneven board manufactured by slicing natural wood are not impaired, and the durability required for industrial products can be imparted to the surface of the uneven board. This method enables manufacturing of the wooden decorative board maintaining the texture of real wood at low cost and with stable quality. This technique is widely usable as a technique of applying woody design using real wood to exterior housings of home appliances, mobile devices, etc. and resin parts such as interior parts for automobiles.

EXPLANATIONS OF LETTERS OR NUMERALS

1 injection molding resin layer
2 first adhesive layer
3 support
4 uneven board
5 second adhesive layer
6 transparent film
7 hard coat layers
8 wooden decorative board
9 insert-molded article
10 surface unevenness protective layer
11 wooden decorative board
12 insert-molded article
13 xylem vessels
100 transfer film
101 transfer layer
102 base film
103 release layer
104 hard coat layer
105 anchor layer
106 UV cut layer
107 uneven board adhesive layer
108 uneven portion
109 wooden decorative board
110 cutter
111 gate
112 insert-molded article
200 first press mold
201 second press mold

What is claimed is:

1. A wooden decorative board comprising:
an uneven board made of natural wood and including a plurality of uneven portions provided on a surface due to xylem vessels; and
a hard coat layer or a protective layer having uneven portions different in size provided on a surface of the uneven board,
wherein a plurality of first concave portions and a plurality of second concave portions smaller than the first concave portions are provided on a surface of the hard coat layer or the protective layer,
wherein a magnitude relationship of a height difference or depth of uneven shapes on the surface of the hard coat layer or the protective layer satisfies a relational expression of $H1>H2>H3$, where $H1$ is a height or depth of the uneven portions having a shape similar to the xylem vessels of the uneven board, $H2$ is a height or depth of the plurality of first concave portions formed on the surface of the hard coat layer or the protective layer, and $H3$ is a height or depth of the plurality of second concave portions smaller than the first concave portions provided on the surface of the hard coat layer or the protective layer,
wherein the pluralities of first and second concave portions provided on the surface of the hard coat layer or the protective layer on the surface of the wooden decorative board have a shape transferred from multiple types of fillers without any fillers remaining on the surface of the hard coat layer or the protective layer, each type of filler being different in size,
wherein the height or depth $H2$ of the first concave portions provided on the surface of the hard coat layer or the protective layer is 15 µm or more and 30 µm or less,
and wherein the height or depth $H3$ of the second concave portions smaller than the first concave portions provided on the surface of the hard coat layer or the protective layer is 0.5 µm or more and 8 µm or less.

2. The wooden decorative board according to claim 1, wherein a glossiness of the surface of the hard coat layer or the protective layer on the surface of the wooden decorative board is 10% or less at all angles of 20°, 60°, and 85°.

3. The wooden decorative board according to claim 1, wherein the hard coat layer or the protective layer provided on the surface of the wooden decorative board is made of an after-cure type ultraviolet-curing resin or an electron-beam-curing resin.

4. The wooden decorative board according to claim 1, wherein a layer configuration of films provided on the surface of the wooden decorative board is made up of a plurality of layers including at least one of an ultraviolet cut layer, an anchor layer, and an adhesive layer in addition to the hard coat layer or the protective layer.

5. The wooden decorative board according to claim 1, wherein a total thickness of the films provided on the surface of the wooden decorative board is 4 µm or more and 80 µm or less.

6. The wooden decorative board according to claim 1, wherein the uneven board used for the wooden decorative board is impregnated with resin inside the uneven board.

7. A molded article using the wooden decorative board according to claim 1, wherein a plurality of uneven shapes different in size is formed on the surface of the hard-coat layer or the protective layer,
wherein the uneven shapes include uneven shapes transferred from portions other than the uneven portions due to xylem vessels of the uneven board, and
wherein uneven portions having a largest size among the transferred uneven shapes have a convex shape.

* * * * *